(12) United States Patent
Durairaj et al.

(10) Patent No.: US 12,054,091 B1
(45) Date of Patent: Aug. 6, 2024

(54) COLOR CHANGING VEHICLE TO IMPROVE VISIBILITY

(71) Applicant: UIPCO, LLC, San Antonio, TX (US)

(72) Inventors: Ravi Durairaj, San Antonio, TX (US); Gregory Brian Meyer, San Antonio, TX (US); Oscar Roberto Tijerina, San Antonio, TX (US); Sean Carl Mitchem, San Antonio, TX (US); Stacy Callaway Huggar, San Antonio, TX (US); Ruthie D. Lyle, Durham, NC (US); Nathan Lee Post, Rockport, TX (US); Mark Anthony Lopez, Helotes, TX (US); Nolan Serrao, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/299,921

(22) Filed: Apr. 13, 2023

Related U.S. Application Data

(62) Division of application No. 16/710,078, filed on Dec. 11, 2019, now Pat. No. 11,654,821.

(51) Int. Cl.
*B60R 13/00* (2006.01)
*B60Q 1/26* (2006.01)
(Continued)

(52) U.S. Cl.
CPC .............. *B60Q 1/26* (2013.01); *B60Q 1/482* (2013.01); *B60R 13/00* (2013.01); *G02F 1/0147* (2013.01);
(Continued)

(58) Field of Classification Search
CPC ...... B60Q 1/26; B60Q 1/482; B60Q 2400/10; B60R 13/00; G02F 1/0147; H05B 44/00; F41H 3/00
See application file for complete search history.

(56) References Cited

U.S. PATENT DOCUMENTS

| 6,037,865 A | * | 3/2000 | Heinz | ...................... B60Q 1/30 |
| | | | | 340/463 |
| 2013/0179035 A1 | * | 7/2013 | Adachi | ................ B60Q 1/5035 |
| | | | | 701/36 |
| 2018/0130445 A1 | | 5/2018 | Dazé | |

FOREIGN PATENT DOCUMENTS

| KR | 20200049081 A | * | 5/2020 | ............... B60Q 1/26 |
| RU | 165880 U1 | | 11/2016 | |
| WO | WO-2006096181 A1 | * | 9/2006 | ............... F41H 3/00 |

OTHER PUBLICATIONS

English Machine Translation of Kim KR-20200049081 (Year: 2023).*
Notice of Allowance mailed Jan. 17, 2023 for U.S. Appl. No. 16/710,078.

* cited by examiner

*Primary Examiner* — Donald L Raleigh
(74) *Attorney, Agent, or Firm* — Plumsea Law Group, LLC

(57) ABSTRACT

A system and method for changing the exterior color of a vehicle is disclosed. The system includes a vehicle with a color change system integrated into the vehicle body of the vehicle. The color change system can change the color of a portion of the vehicle body in response to commands from a color change module running on a computing system within the vehicle. The color change module can detect information about the vehicle's environment to determine an appropriate target exterior vehicle color that contrasts substantially with the vehicle's environment.

20 Claims, 17 Drawing Sheets

(51) Int. Cl.
  *B60Q 1/48*    (2006.01)
  *G02F 1/01*    (2006.01)
  *H05B 44/00*   (2022.01)
  *B60Q 1/52*        (2006.01)
  *F41H 3/00*        (2006.01)
  *G02F 1/1685*      (2019.01)
  *G06N 3/04*        (2023.01)
  *G06N 3/08*        (2023.01)
  *G07C 5/08*        (2006.01)
  *G09G 3/34*        (2006.01)

(52) U.S. Cl.
  CPC ............... *H05B 44/00* (2022.01); *B60Q 1/52* (2013.01); *B60Q 2400/10* (2013.01); *F41H 3/00* (2013.01); *G02F 1/1685* (2019.01); *G06N 3/04* (2013.01); *G06N 3/08* (2013.01); *G07C 5/0825* (2013.01); *G09G 3/344* (2013.01)

COLOR CHANGING VEHICLE TO IMPROVE VISIBILITY

CROSS-REFERENCE TO RELATED APPLICATION

This application is a division U.S. patent application Ser. No. 16/710,078, filed Dec. 11, 2019, and entitled "Color Changing Vehicle to Improve Visibility," the disclosure of which application is incorporated by reference herein in its entirety.

TECHNICAL FIELD

The present disclosure generally relates to motor vehicles, and specifically to vehicles that can change color.

BACKGROUND

Vehicle safety often depends on other drivers and/or pedestrians being able to clearly see a vehicle. However, in some situations, it can be difficult to see a vehicle. This is especially true when the exterior color of the vehicle blends in with other colors in the environment. For example, it may be difficult to see dark vehicles at night or to see very light colors in white out conditions. Some vehicles may use exterior lights (such as sirens) to improve their visibility, but the use of exterior lights is often limited to emergency vehicles.

There is a need in the art for a system and method that addresses the shortcomings discussed above.

SUMMARY

In some aspects, the techniques described herein relate to a motor vehicle, including: a vehicle body, a motor and a set of wheels; a color changing layer attached to a portion of the vehicle body; a sensor; an onboard computing system including: a processor; and memory storing a color change module; wherein the color change module is configured to receive sensor information from the sensor and control the color changing layer in response to the sensor information.

In some aspects, the techniques described herein relate to a motor vehicle, including: a vehicle body, a motor and a set of wheels; a color changing layer attached to a portion of the vehicle body; and an onboard computing system including: a processor; and memory storing instructions that are executable by the processor to: determine a current exterior vehicle color; receive information about an environment of the motor vehicle, the environment being associated with a background color; determine a target exterior vehicle color that contrasts substantially with the background color; and change the exterior color of the motor vehicle from the current exterior vehicle color to the target exterior vehicle color when the target exterior vehicle color is substantially different from the current exterior vehicle color.

In some aspects, the techniques described herein relate to a color change system for use in a motor vehicle, the color change system including: a color changing layer attached to a portion of the motor vehicle; a sensor; a computing system including: a processor; and memory storing a color change module; wherein the color change module is configured to receive sensor information from the sensor and control the color changing layer in response to the sensor information.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a method and system to improve driving safety by making a vehicle more visible within a given driving environment. Specifically, a vehicle whose exterior color can be changed is provided. Additionally, methods of changing the exterior color in response to information about an environment of the vehicle are provided. The method includes identifying a background color associated with a given environment and selecting a target exterior vehicle color that contrasts with the background color. The method further includes changing the exterior vehicle color to the target exterior vehicle color so that the vehicle is more visible in the environment.

By changing the vehicle's exterior color, the system and method facilitate improved visibility of a vehicle from the view of other drivers and/or pedestrians. Additionally, by changing the vehicle's exterior color, a vehicle can be more readily visible to a driver or owner searching for the vehicle in a parking lot.

Figure 1:
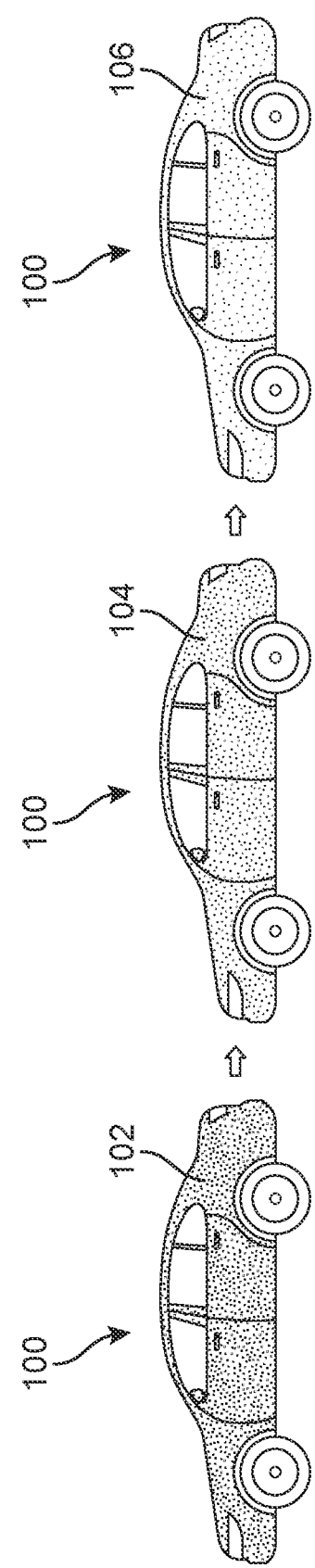
FIG. 1 is a schematic view of a motor vehicle changing colors, according to an embodiment.

FIG. 1 is a schematic view of a motor vehicle 100 as it changes colors. Specifically, motor vehicle changes from a first exterior vehicle color 102 to a second exterior vehicle color 104. And then motor vehicle changes from the second exterior vehicle color 104 to a third exterior vehicle color 106. Here, it may be appreciated that each of first exterior vehicle color 102, second exterior vehicle color 104, and third exterior vehicle color 106 are substantially different from one another. For purposes of illustration, the different colors are indicated by different amounts of shading in the drawings. However, in the embodiments, these colors could comprise any suitable colors for a motor vehicle. Examples of colors that could be used include, but are not limited to: black, white, grey, red, orange, yellow, green, blue, purple, violet, as well as any other suitable color.

While the exemplary embodiment of FIG. 1 depicts a vehicle changing between three different colors, in other embodiments a vehicle could change between only two colors. In still other embodiments, a vehicle could change between four or more colors. The number of colors may generally depend on the type of technology used for implementing exterior color changes of the vehicle.

Figure 2:
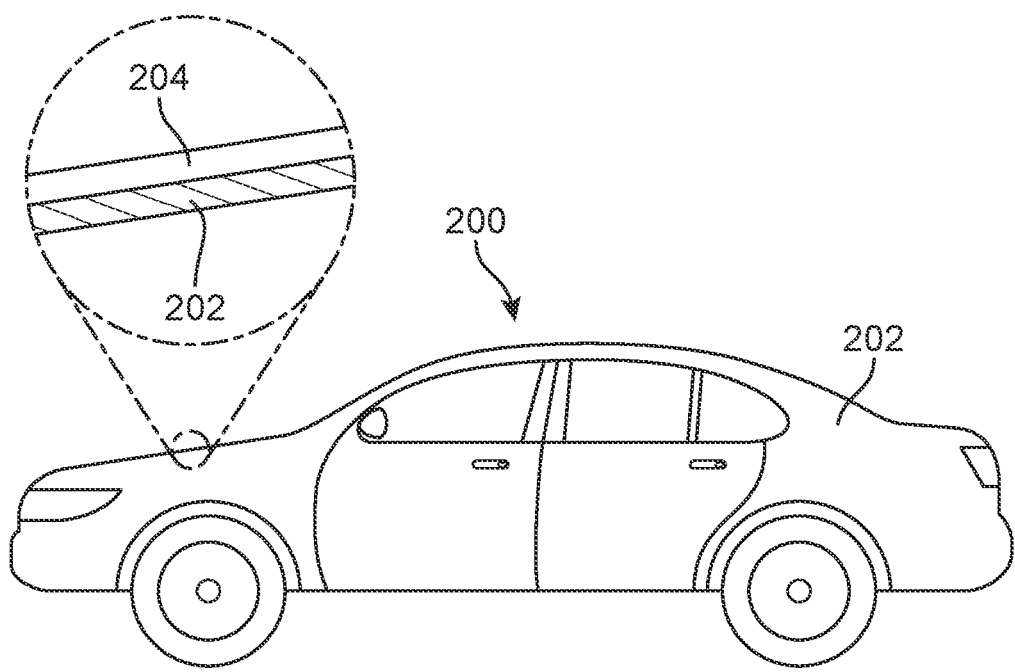
FIG. 2 is a schematic view of a motor vehicle incorporating a color changing layer into a vehicle body, according to an embodiment.
Figure 3:
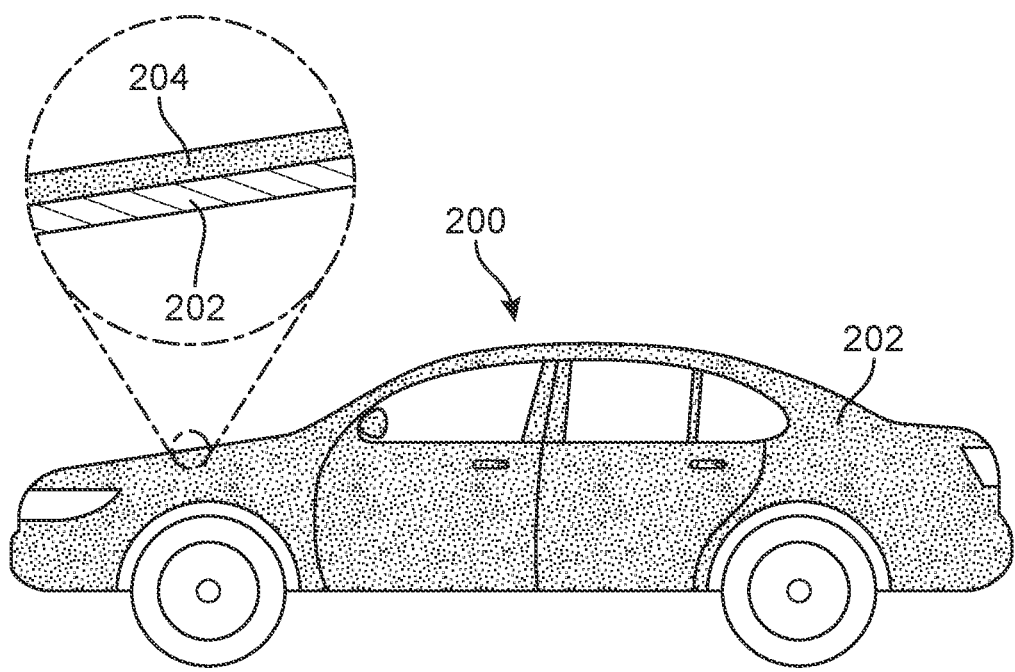
FIG. 3 is a schematic view of the motor vehicle of FIG. 2, in which the color changing layer has changed colors.

FIGS. 2-3 are schematic views of a vehicle that incorporates a color change system to change the color of the vehicle exterior. As seen in FIG. 2, vehicle 200 includes a vehicle body 202 that is covered, in at least some locations, with a color changing layer 204 of a color change system. As shown in the enlarged view of FIG. 2, in some cases, color changing layer 204 may be attached to an exterior of vehicle body 202. However, in other cases, color changing layer 204 could be embedded within the vehicle body. In some cases, the vehicle body could be constructed from one or more color changing layers. Referring to FIG. 3, color changing layer 204 may change colors (indicated with shading), while the underlying portion of vehicle body 202 remains unchanged.

Figure 4:
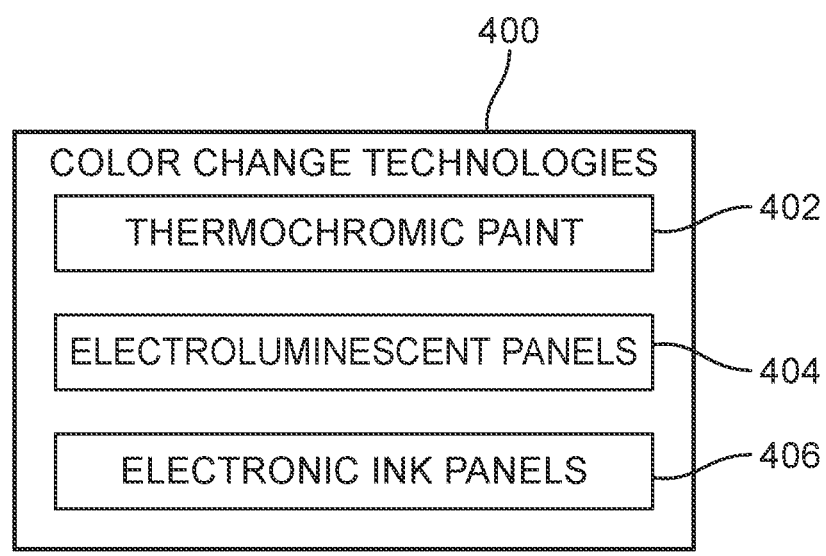
FIG. 4 is a schematic view of color change systems, according to an embodiment.

FIG. 4 is a schematic view of several kinds of color change technologies 400. These include a thermochromic paint 402. A thermochromic paint may be any paint that changes color due to a change in temperature. Thermochromic paints could use any known thermochromic substances that are suitable for paints. These include thermochromatic liquid crystals, leuco dyes, or other suitable thermochromic substances. Thermochromic paints could be activated by external changes in the temperature of the vehicle's environment. Alternatively, thermochromic paints could be activated using heating and/or cooling elements disposed adjacent to the body panels where the thermochromic paints are applied.

In another embodiment, a vehicle could incorporate electroluminescent (EL) panels 405. These panels may comprise any kind of electroluminescent materials arranged into various structures such as wires or films. In another embodiment, the exterior of a vehicle could incorporate panels 406 that implement electronic ink technology. Any suitable kind of electronic ink technology could be used, including electrophoretic, electrowetting, and interferometric modulator technologies. The electronic ink could be provided in a grayscale or in a range of colors.

It may be appreciated that in other embodiments, any other suitable color change technologies could be used to facilitate changing the exterior color of a vehicle.

Figure 5:
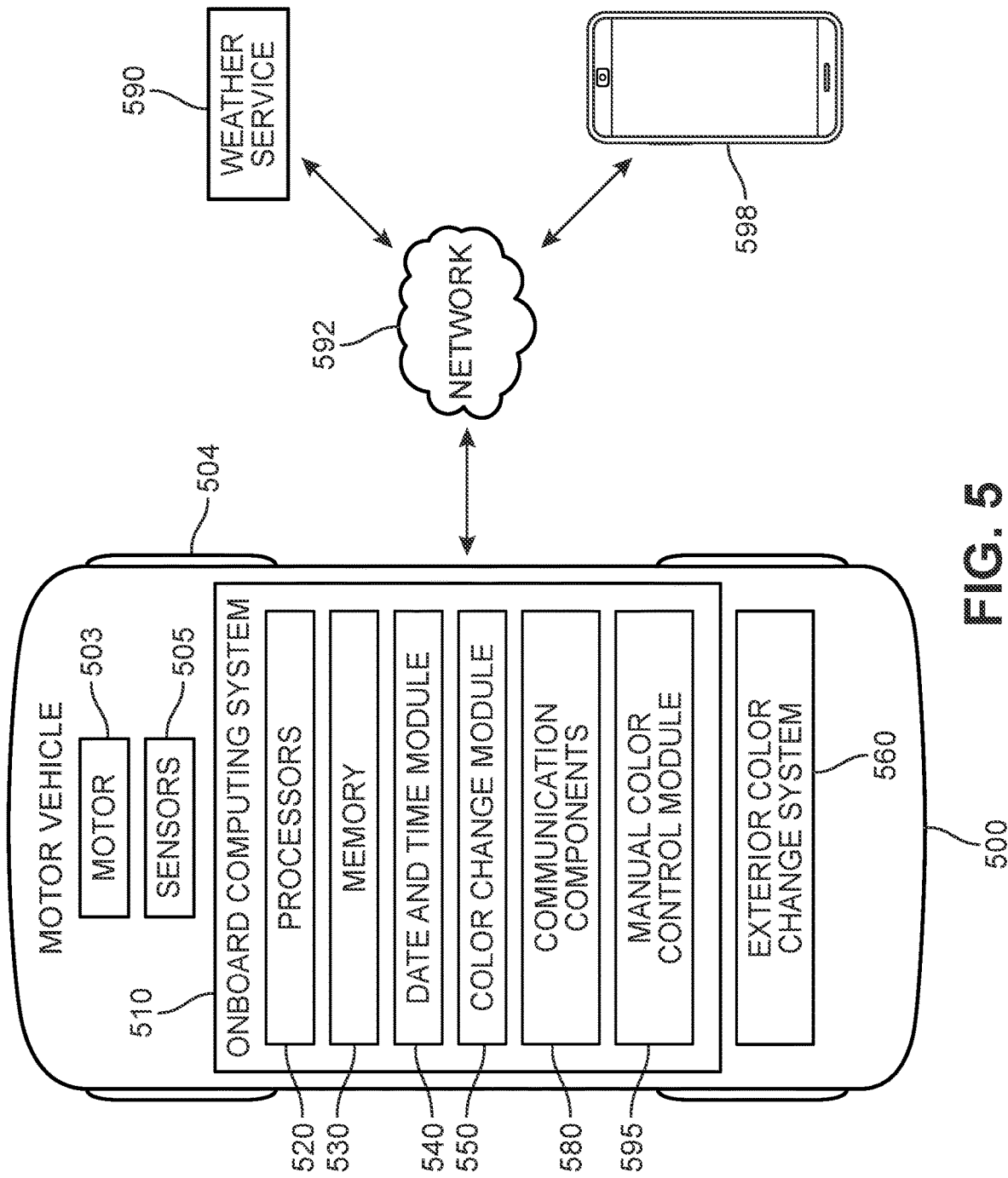
FIG. 5 is a schematic view of a motor vehicle and various subsystems of the motor vehicle, according to an embodiment.

FIG. 5 is a schematic view of a motor vehicle 500, or simply vehicle 500, which may include a motor 503 that powers wheels 504. Vehicle 500 may include an onboard computing system 510. Onboard computing system 510 may comprise a single computing device, or a network of multiple computing devices. Onboard computing system 510 could be associated with one or more electronic control units (ECUs). As seen in FIG. 5, onboard computing system 510 includes one or more processors 520 and memory 530. Memory 530 may comprise a non-transitory computer readable medium. Instructions stored within memory 530 may be executed by the one or more processors 520.

For clarity, some of the vehicle systems of the embodiments are depicted as residing within a single onboard computing system 510. However, it may be appreciated that in some embodiments, one or more of these systems could be separate and may not comprise part of a single computing system. Instead, two or more systems could each comprise their own processors and/or memory, as well as components facilitating communication with other systems.

Vehicle 500 may comprise a date and time module 540. Date and time module 540 could be used to provide the date and/or time to any other systems within vehicle 500.

Vehicle 500 may include provisions for changing the color of one or more portions of the vehicle. In the embodiment of FIG. 5, vehicle 500 includes a color change module 550. Color change module, which is described in further detail below, can receive input and generate output that is provided to one or more components of an exterior color exchange system 560. An exterior color change system could be any system or device that enables one or more portions of the vehicle's exterior to change color. Exemplary systems include, but are not limited to the thermochromic systems, electroluminescent systems and electronic ink-based systems.

Components of an exterior color change system 560 may be disposed on an exterior of a vehicle. For example, EL or e-ink panels could be exposed on an exterior of the vehicle. Likewise, thermochromic paint could be exposed on an exterior of a vehicle. It may be appreciated that wired or wireless communication could be used to connect components of exterior color change system 560 with color change module 550 such that color change module 550 can control exterior color change system 560.

Figure 6:
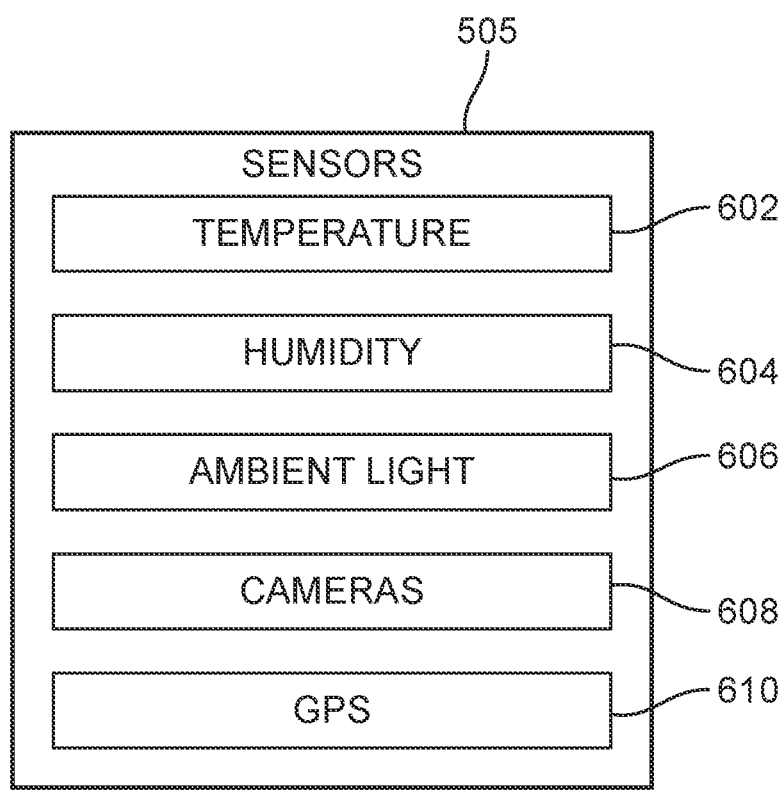
FIG. 6 is a schematic view of sensors within a motor vehicle, according to an embodiment.

Vehicle 500 may also comprise one or more sensors 505. In some cases, these sensors can provide information that is processed by color change module 550. Any suitable vehicle sensors can be incorporated. Exemplary sensors are shown in FIG. 6. These may include, but are not limited to: temperature sensors 602, humidity sensors 604, ambient light sensors 606, cameras 608, and GPS sensors 610. Vehicle 500 may also include an onboard diagnostics (OBD) system, which is not shown for clarity. An OBD system may track and process various vehicle sensor information. In some cases, one or more systems of vehicle 500 could retrieve sensory data from the OBD system rather than directly from the sensors themselves.

Vehicle 500 may also include one or more communication components 580. Communication components 150 may include cellular network components for communicating over cellular networks, Wi-Fi components for communicating over Wi-Fi networks, and other communication components. Using communication components 580, color change module 550 may request and receive information from remote services. As one example, color change module 550 could request and receive information from a weather service 590 over a network 592.

In some embodiments, a user could manually control a control change system. As an example, a manual color control module 595 could communicate with a user's mobile device 598 over network 592. Using device 598, a user could select one or more available colors from a list using a mobile application. This selection can be communicated to manual color change module 595, which may provide further instructions to exterior color change system 560.

Figure 7:
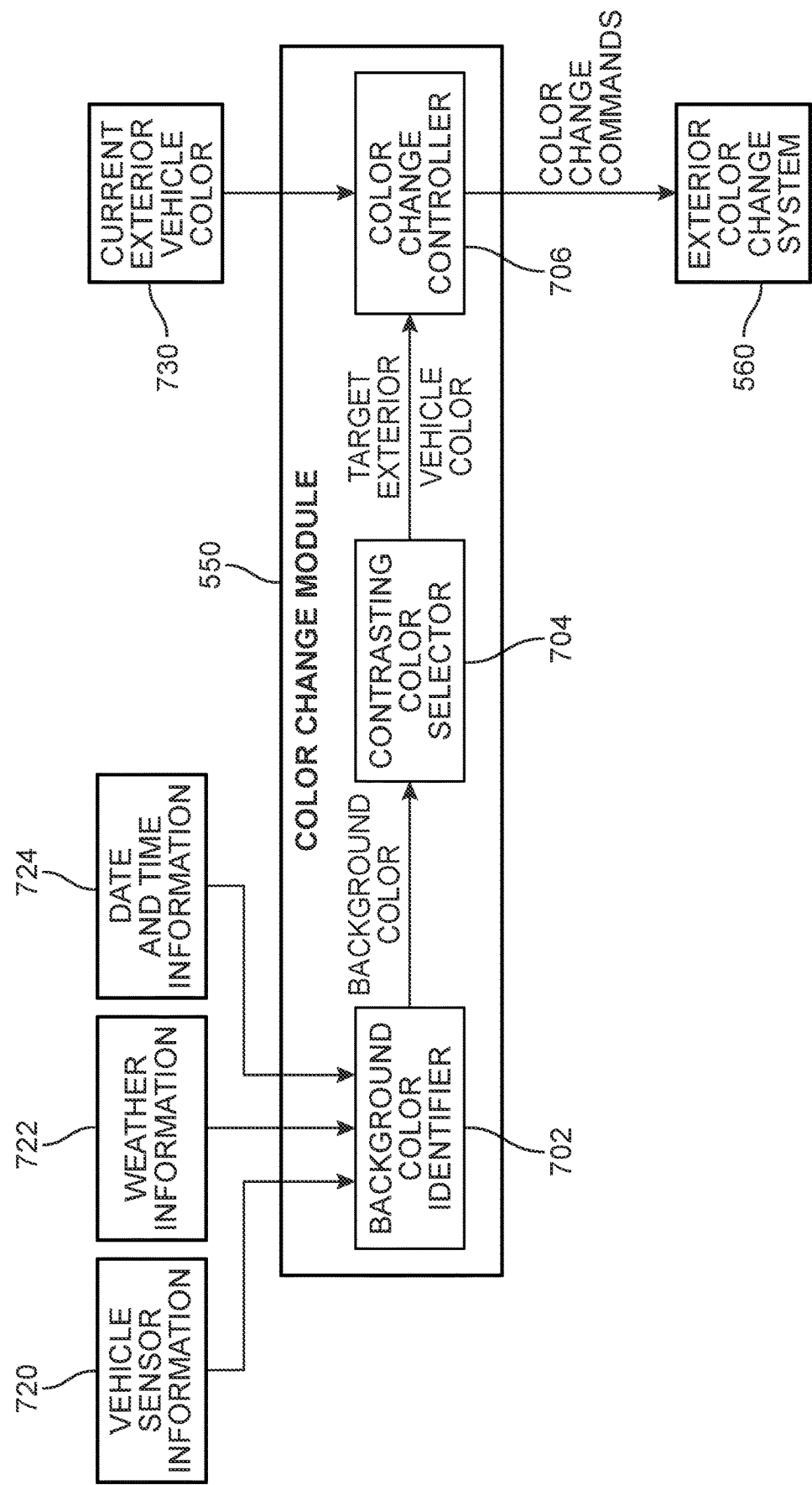
FIG. 7 is a schematic view of a color change module including various sub-modules, according to an embodiment.

FIG. 7 is a schematic view of color change module 550, including various inputs and outputs of the module. As seen in FIG. 7, color change module 550 may include one or more sub-modules. Specifically, color change module 550 comprises a background color identifier 702, a contrasting color selector 704, and a color change controller 706.

Background color identifier 702 may include various algorithms for identifying a background color for a driving environment. The term "background color" refers to the dominant color that nearby drivers and/or other observers would see when looking around the environment where a vehicle is located. For example, if the vehicle is driving on a road at night, the background color could be black or a dark blue color. As another example, if the vehicle is driving in snow, the background color could be white or another light color. In some cases, the background color could be a mix of two or more colors from the environment.

Background color identifier 702 can identify a background color using various kinds of input information. For example, color change module 550 may receive vehicle sensor information 720 (for example, from vehicle sensors 505), weather information 722 (for example, from weather service 590), and date and time information 724 (for example, from date and time module 540). Vehicle sensor information 720 can be used to infer a background color. For example, information from an ambient light sensor 606 can be used to infer that it's dark and so the background color is likely a dark color such as black or a dark blue. Likewise, information from a temperature sensor 602 and/or humidity sensor 604 could be used to infer that it's raining or snowing outside, and thus infer a corresponding background color. Additionally, information from a GPS sensor 610 could be used to infer that a vehicle is in a particular location, which may have a known background color. It may be appreciated that in some cases, information from a camera 608 could be used to capture images of an environment so that a background color could be used detected directly.

Additionally, weather information 722 could be used to infer the background color of an environment. If the weather information indicates that there is significant snow, or a blizzard, the system can assume the background color is white. Additionally, using data and time information 724, the system may infer if its light or dark outside and thus infer the general background color.

Background color identifier outputs a background color, which is received as input to contrasting color selector 704. Contrasting color selector 704 includes one or more algorithms for selecting a target exterior vehicle color that contrasts with the background color identified by the background color identifier 702. For example, if the background color is black, the target exterior vehicle color make be a light color such as white or bright yellow, to contrast with the black background color.

Contrasting color selector 704 outputs a target exterior vehicle color, which is received as input to color change controller 706. Color change controller 706 includes one or more algorithms for converting a target exterior vehicle color into color change commands (or control signals) that can be used to control exterior color change system 560. These commands could be provided as digital signals and/or analog signals according to the type of exterior color change system that is used. In some cases, the output of color change controller 706 could be dependent on the state of the color change system. For example, in some cases color change controller 706 can retrieve the current exterior vehicle color 730 from memory in order to determine an appropriate output (set of commands).

Embodiments can use machine learning algorithms to infer or otherwise determine a background color for a driving environment. The utility of using a machine learning algorithm may be appreciated by considering the difficulty of trying to infer a general background color for a driving environment based on limited information such as time of day, lighting conditions, and/or other environmental information. Moreover, if images of the environment are used, a suitable machine learning model may be used to classify the dominant background color in the image that would be most visible to another driver or pedestrian, for example.

Figure 8:
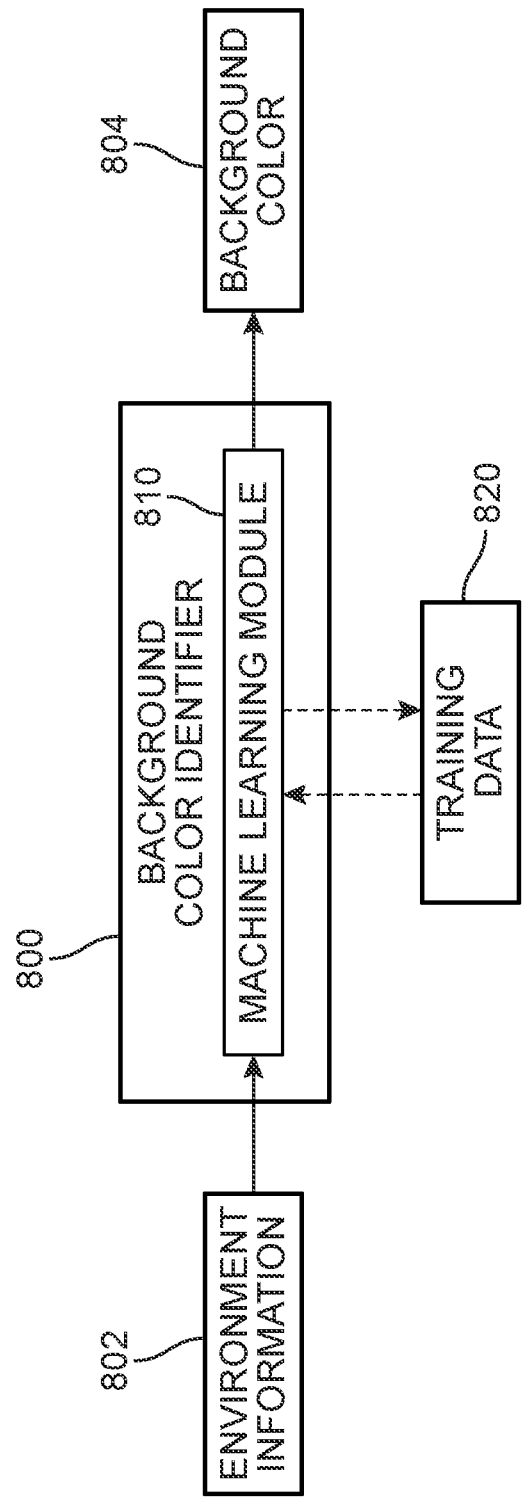
FIG. 8 is a schematic view of a background color identifier that includes a machine learning module, according to an embodiment.

FIG. 8 is a schematic view of a background color identifier 800 that may use machine learning algorithms to determine a background color 804 based on various kind of environmental information 802. Specifically, background color identifier 800 includes a machine learning module 810 that utilizes one or more machine learning algorithms or models. Exemplary machine learning models that could be used include, but are not limited to, neural networks, decision trees, random forests, support vector machines and/or other kinds of machine learning models.

As seen in FIG. 8, prior to deploying background color identifier 800, training data 820 can be used to train machine learning module 810 to produce a correct background color based on various kinds of input environmental information. In some cases, the system can be trained in a supervised manner, with a human user identifying a background color for a given environment and providing this known answer for the background color to the machine learning module for purposes of training.

Figure 9:
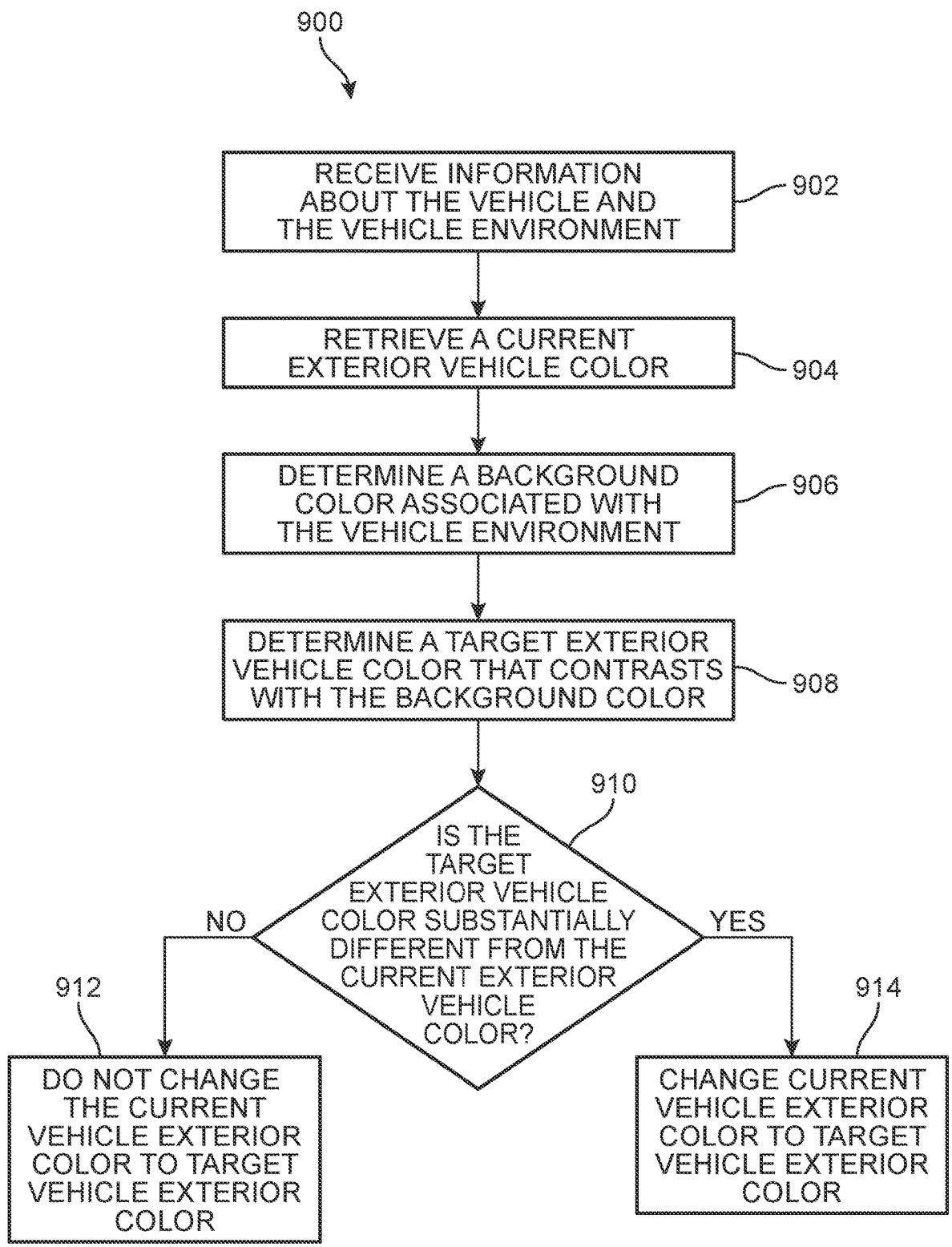
FIG. 9 is a schematic view of a process for changing the exterior color of a motor vehicle, according to an embodiment.

FIG. 9 is a schematic view of a process for changing the exterior color of a vehicle. It may be appreciated that one or more of these steps may be performed by an onboard computing system, such as onboard computing system 510 (see FIG. 5), also referred to simply as system 510.

Starting in step 902, system 510 may receive information about the vehicle and the vehicle's environment. As described above, information about the vehicle and/or environment can be received from onboard sensors, third party services (such as weather services), or other onboard systems (such as a date and time module).

Next, in step 904, system 510 may retrieve a current exterior vehicle color. The current color may be stored in memory within system 510 (for example, within memory 530). Alternatively, the current color may be retrieved from an exterior color change system, such as exterior color change system 560, which may maintain information about the current state of any active color change systems.

In step 906, system 510 may determine a background color associated with the vehicle environment. This step may be accomplished, in some cases, by background color identifier 702 of color change module 550. In step 908, system 510 may determine a target exterior vehicle color that contrasts with the identified background color. This step may be accomplished, in some cases, by color contrasting selector 704.

In step 910, system 510 determines if the target exterior vehicle color is substantially different from the current exterior vehicle color. If not, then system 510 proceeds to step 912. In step 912, no change is made to the exterior color of the vehicle, since the vehicle already has the target exterior vehicle color (or a substantially similar color). If, in step 910, system 510 determines that the target exterior color is substantially different from the current exterior vehicle color, system 510 may proceed to step 914. In step 914, system 510 changes the current vehicle exterior color to match the target vehicle exterior color. This may be accomplished, in some cases, by color change controller 706 in combination with exterior color change system 560.

Figure 10:
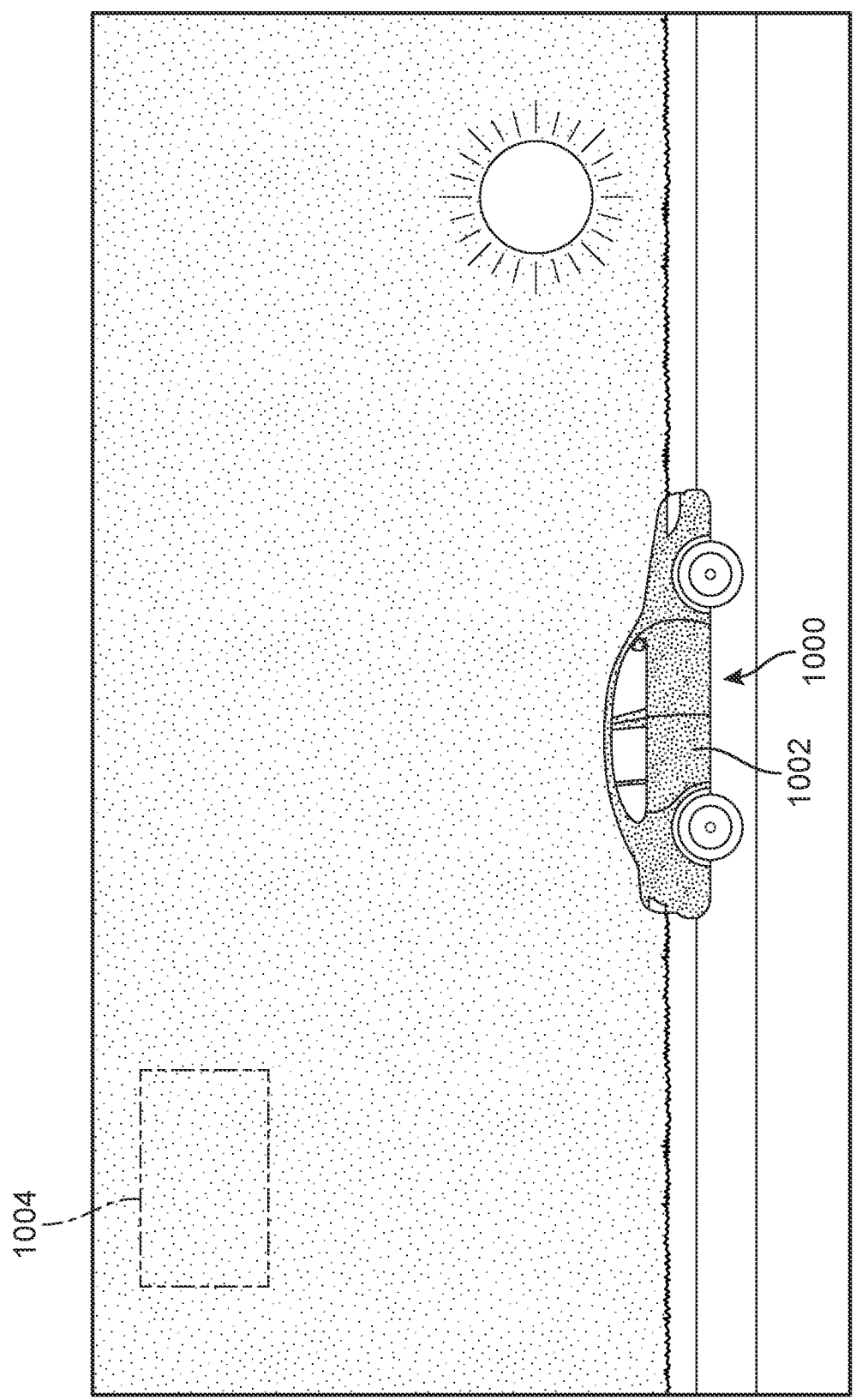
FIGS. 10-13 are schematic views of scenarios where a vehicle color may be changed to make the vehicle stand out against its environment.
Figure 11:
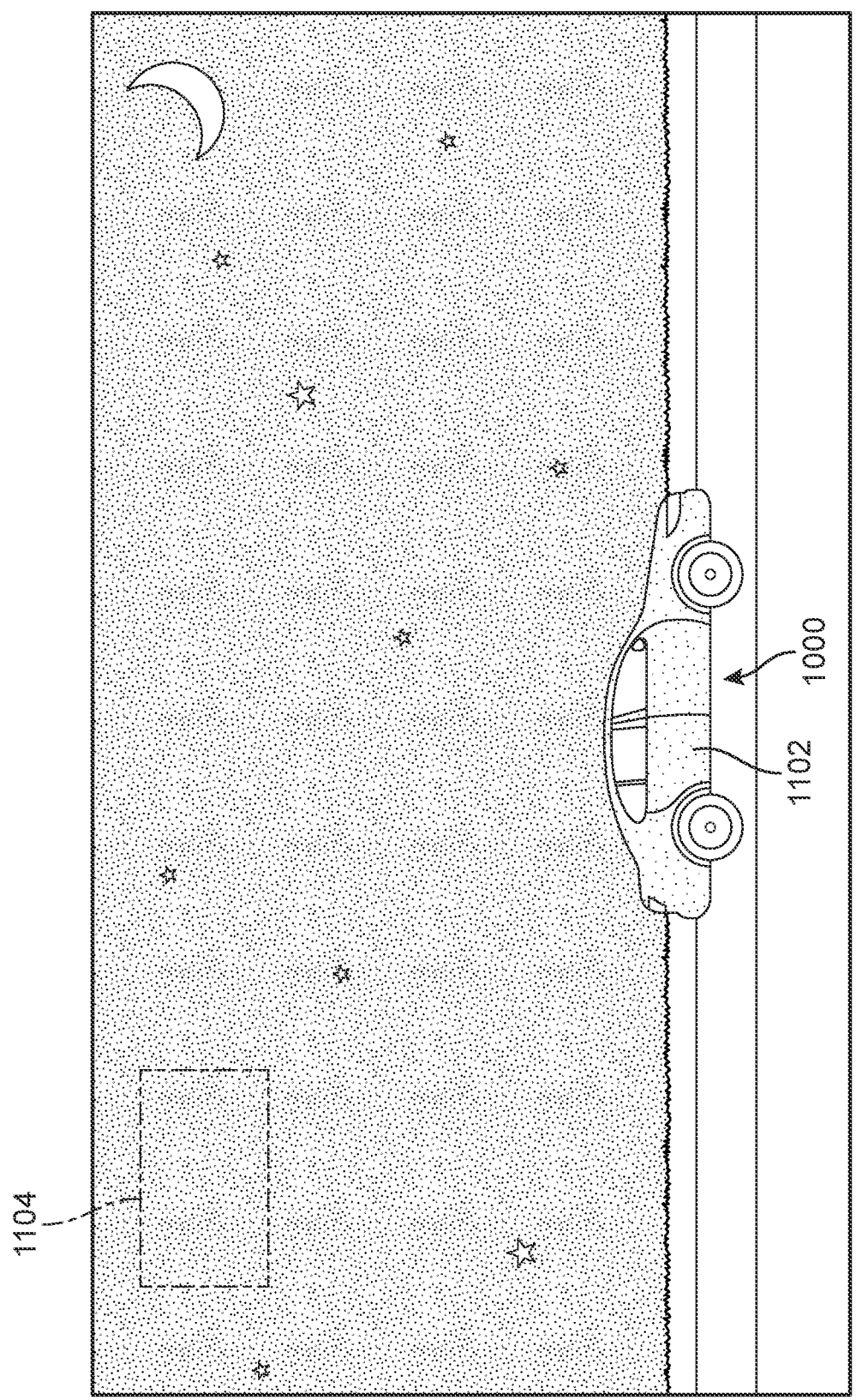

FIGS. 10-13 are schematic views of different scenarios where the present methods and systems for changing the exterior color of a vehicle may be helpful in making the vehicle more visible to other drivers, pedestrians, and/or any other observer. For example, FIGS. 10-11 are schematic views showing how the exterior color of a vehicle can be changed in response to lighting conditions. In FIG. 10, a vehicle 1000 is seen driving on a road. The current exterior vehicle color is a dark color 1002. Moreover, the current background color is seen to be a medium light color 1004. In this case, the dark vehicle color is visible in contrast to the medium light background color. However, in FIG. 11, as the sun has set, the background color has changed to a dark color 1104. In response, the exterior vehicle color is changed to a light color 1102. This light color contrasts with the dark color of the background, thereby making vehicle 1000 more visible to other drivers and pedestrians.

Figure 12:
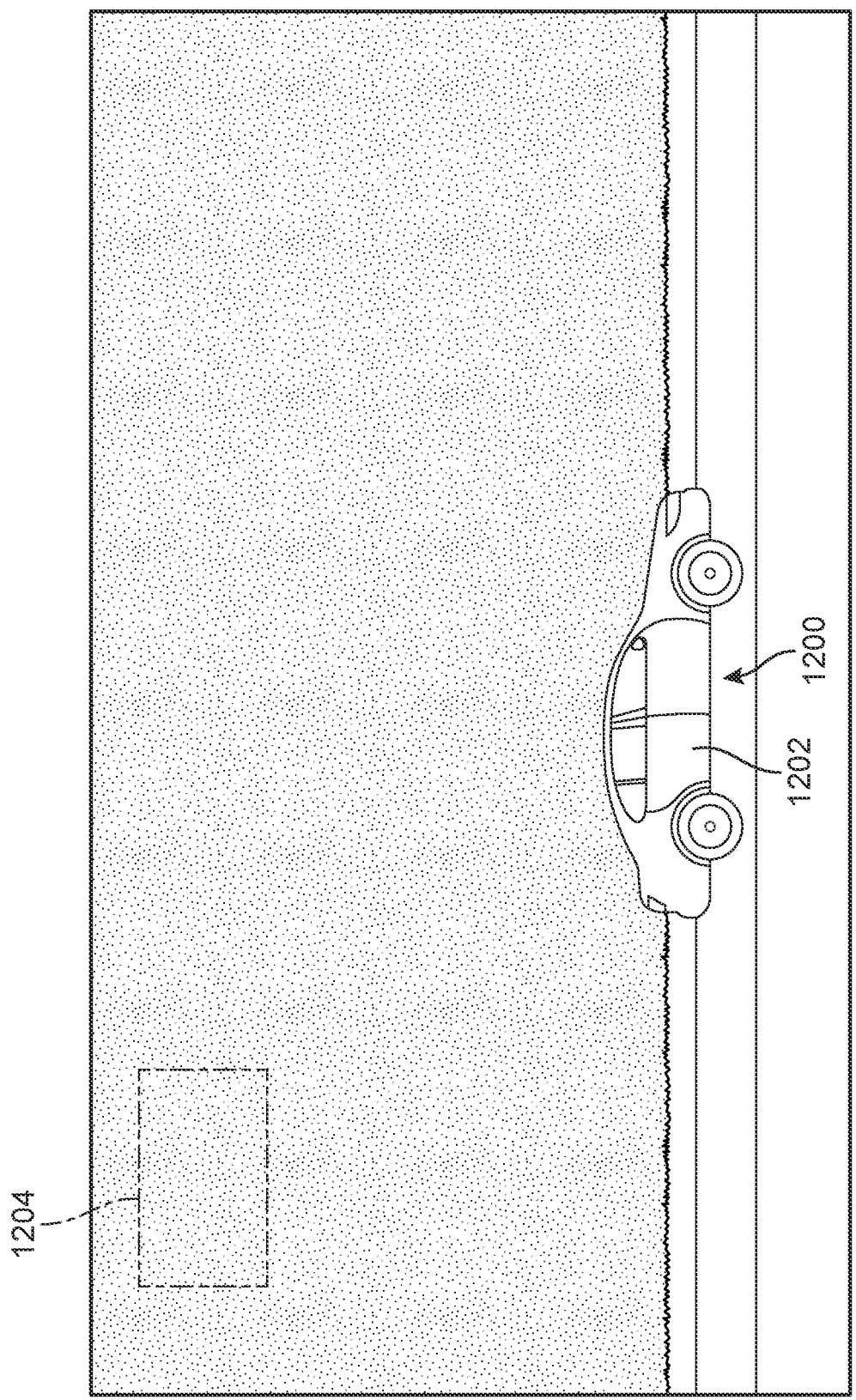
Figure 13:
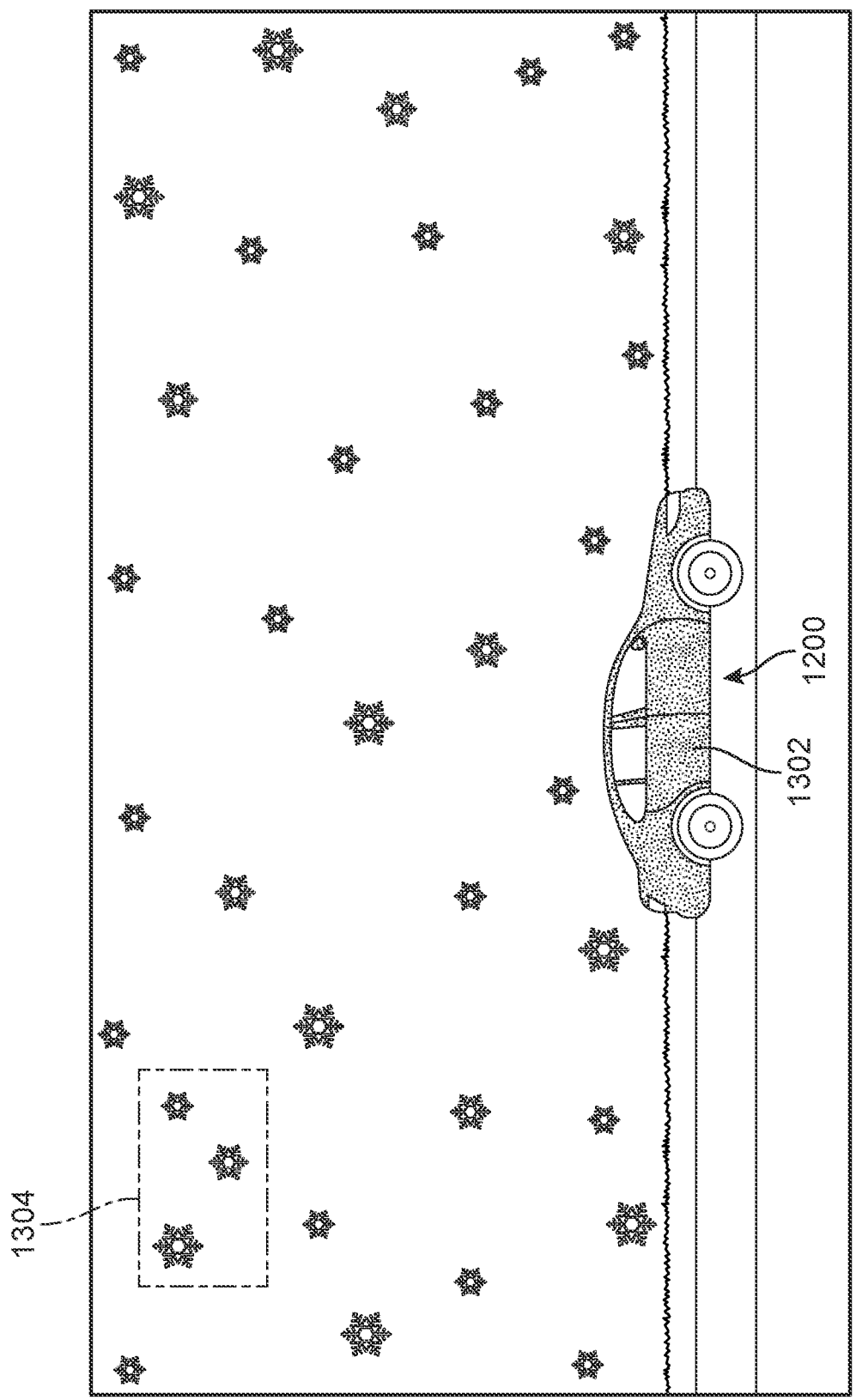

FIGS. 12-13 are schematic views showing how the exterior color of a vehicle can be changed in response to weather conditions. In FIG. 12, a vehicle 1200 is seen driving on a road. The current exterior vehicle color is a white color 1202. Moreover, the current background color is seen to be a medium-light color 1204, representative of the blue sky in the background. In this case, the white vehicle color is visible in contrast to the blue background color. However, in FIG. 13, as the sky turns white and it begins to snow, the background color has changed to a white color 1304. In response, the exterior vehicle color is changed to a dark color 1302. This dark color contrasts with the white color of the background, thereby making vehicle 1200 more visible to other drivers and pedestrians.

Figure 14:
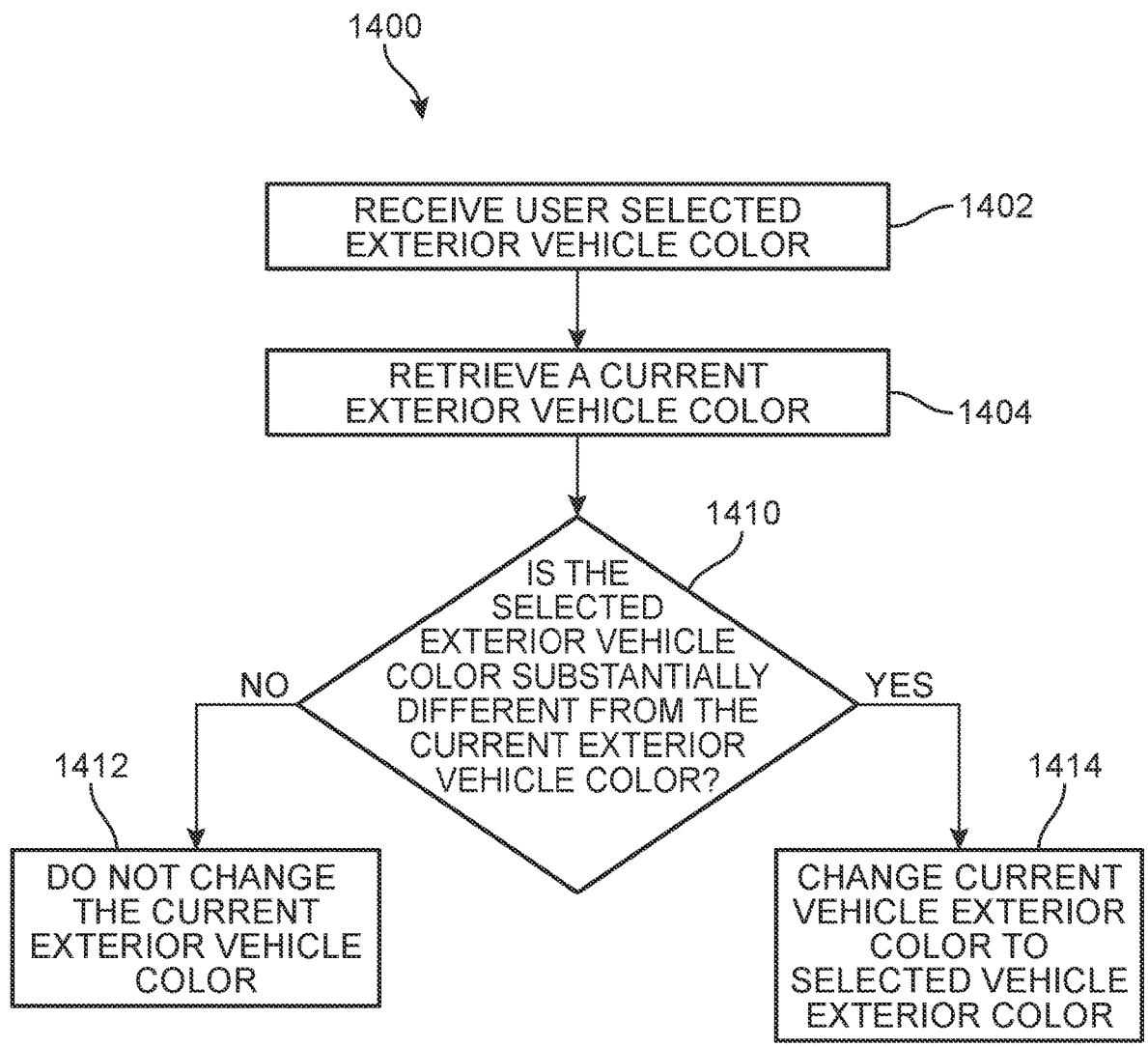
FIG. 14 is a schematic view of a process of changing a vehicle color in response to a manual command from a user, according to an embodiment.

FIG. 14 is a schematic view of a process for changing the exterior color of a vehicle in response to a request from a user. It may be appreciated that one or more of these steps may be performed by an onboard computing system, such as onboard computing system 510, also referred to simply as system 510.

Starting in step 1402, system 510 may receive a user selected exterior vehicle color. In some cases, this selected exterior vehicle color may be received from input provided within the vehicle. For example, a user could use an in-vehicle interface to select a desired exterior color. In other cases, the selected exterior vehicle color may be received from a remote device. For example, manual color control module 595 could receive a selected exterior vehicle color from an application running on mobile device 598 (see FIG. 5). This allows a user to manually change a vehicle's color even when they are not present inside the vehicle. As described in further detail below, this capability may allow a user to change the color of their vehicle so it is more readily visible in a crowded parking lot.

Next, in step 1404, system 510 may retrieve a current exterior vehicle color. The current color may be stored in memory within system 510 (for example, within memory 530). Alternatively, the current color may be retrieved from an exterior color change system, such as exterior color change system 560, which may maintain information about the current state of any active color change systems.

In step 1410, system 510 determines if the selected exterior vehicle color is substantially different from the current exterior vehicle color. If not, then system 510 proceeds to step 1412. In step 1412, no change is made to the exterior color of the vehicle, since the vehicle already has the target exterior vehicle color (or a substantially similar color). If, in step 1410, system 510 determines that the selected exterior color is substantially different from the current exterior vehicle color, system 510 may proceed to step 1414. In step 1414, system 510 changes the current vehicle exterior color to match the target vehicle exterior color. This may be accomplished, in some cases, by manual color control module 595 in combination with exterior color change system 560.

Figure 15:
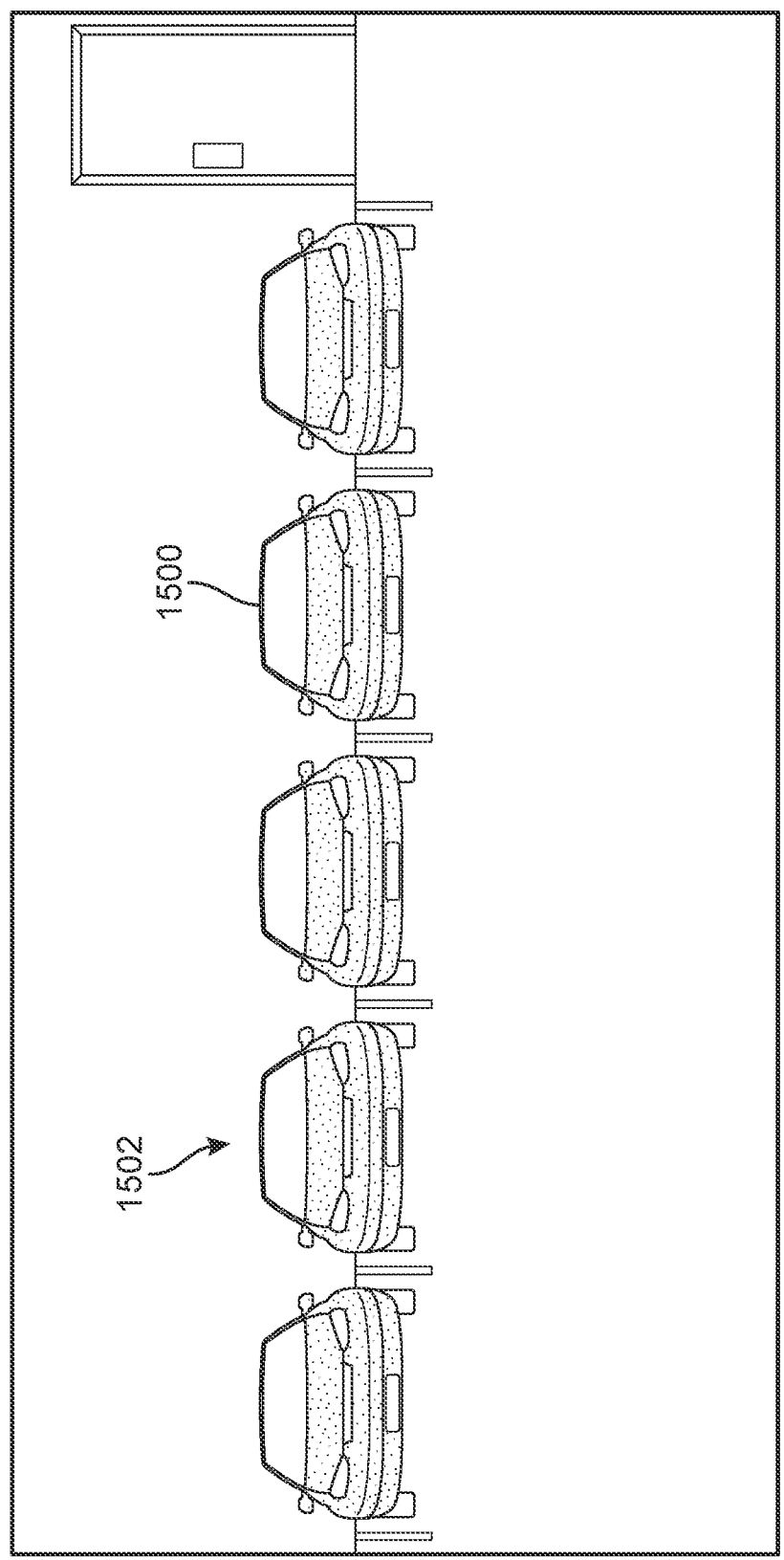
FIGS. 15-16 are schematic views of scenarios where a vehicle color may be changed to make the vehicle more visible to an owner.
Figure 16:
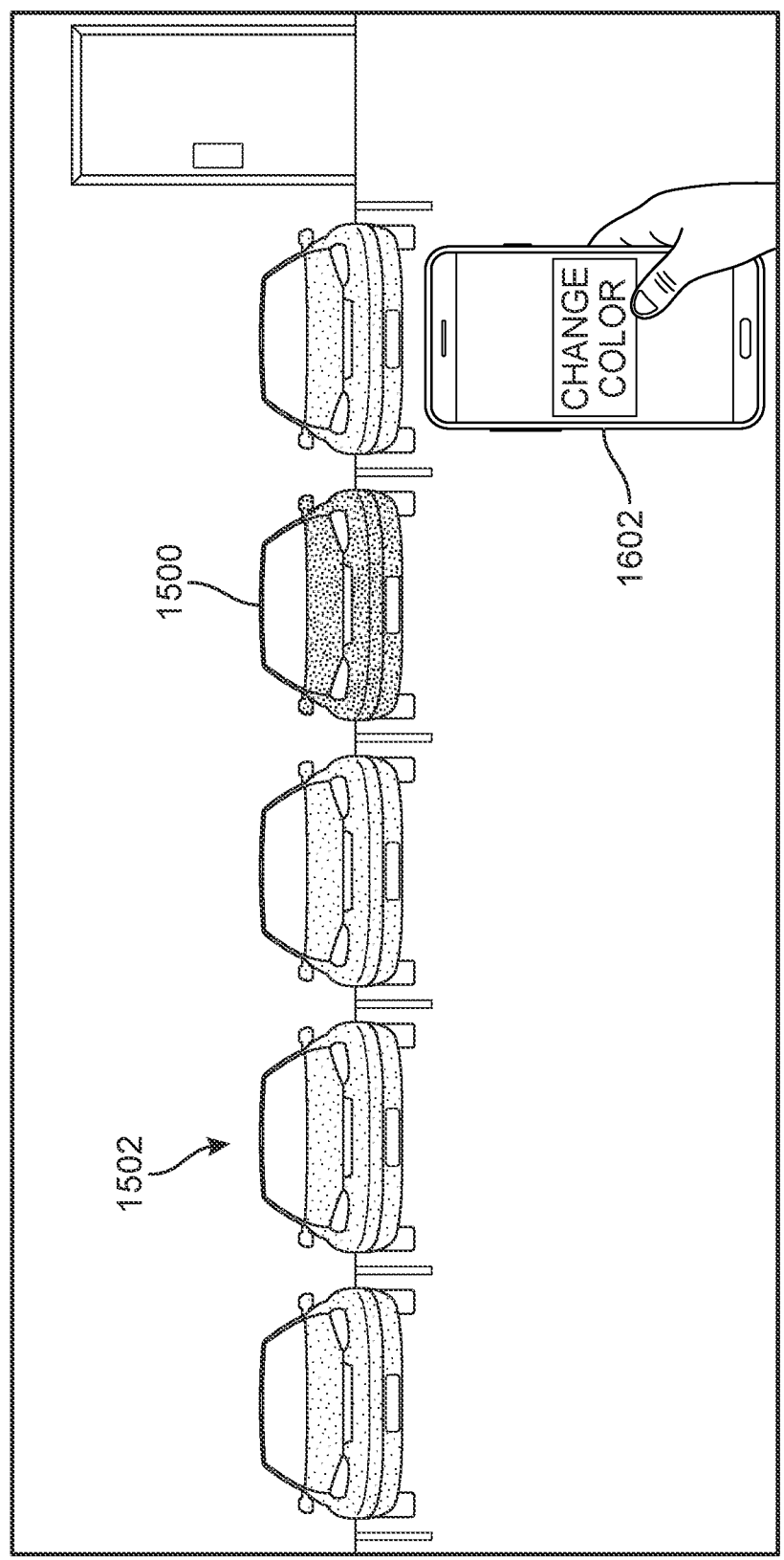

FIGS. 15-16 are schematic views showing how a vehicle's exterior color can be changed to make it stand out against other nearby objects, such as other vehicles. This allows an owner of the vehicle to easily find the vehicle in a crowded parking lot, for example.

In FIG. 15, a vehicle 1500 is parked in row of vehicles 1502. From a distance, it may be difficult for an owner to easily spot the vehicle, especially if the parking lot is large. In this case, the owner could use a remote device 1602, as shown in FIG. 16, to select a new exterior color for the vehicle that makes it stand out against the background.

Figure 17:
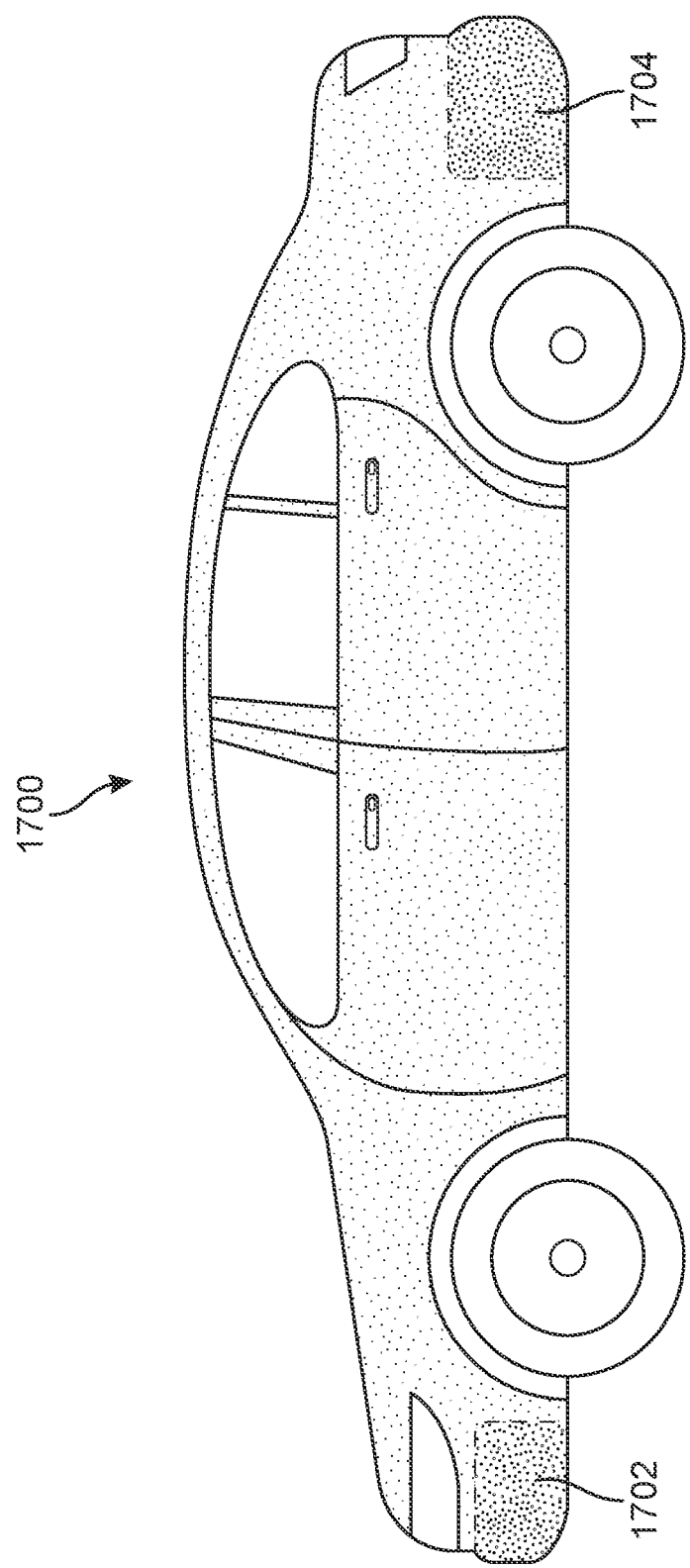
FIG. 17 is a schematic view of a motor vehicle including color change regions, according to an embodiment.

Although some embodiments may comprise systems and methods for changing the color of the full exterior of a vehicle, in other embodiments only some portions of the exterior may change color. For example, FIG. 17 depicts an embodiment of a vehicle 1700 where only the front and rear bumpers can change colors. Specifically, only the front and rear bumpers are comprised of a color change material, such as EL strips or e-ink panels. As seen in FIG. 17, a front portion 1702 and a rear portion 1704 are color changing portions. This configuration allows the color of the bumper to be changed to make the vehicle easier to see for vehicles traveling behind vehicle 1600 and/or in front of vehicle 1700.

Although FIG. 17 depicts a vehicle with color change portions located at the front and rear bumpers, other embodiments could incorporate any other selectively applied color change portions. The color change portions could be associated with any combination of a vehicle's hood, side panels, doors, roof, trunk, or other portions. In other embodiments, the entirety of a vehicle's exterior may be covered with color change systems (such as e-ink panels), but only selected regions may change. This allows the color change portion to be determined dynamically by the system.

In some embodiments, a vehicle's exterior color could be changed in order to provide a signal, such as a distress signal. For example, upon detecting that a vehicle has been involved in a collision or that a driver is in distress, a color change module could automatically activate an emergency color signaling system, in which the vehicle switches between two or more colors to indicate an emergency.

Figure 18:
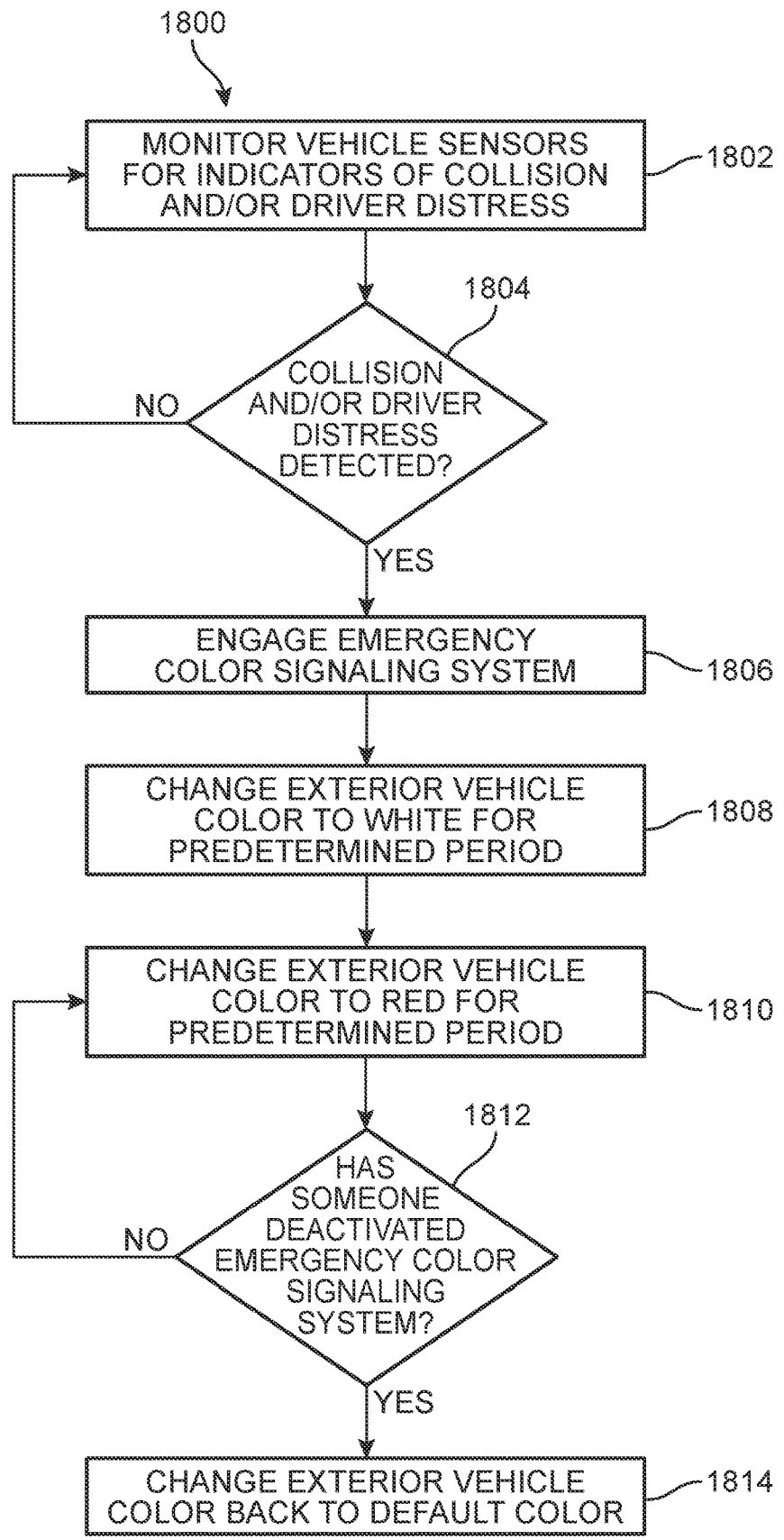
FIG. 18 is a schematic view of a process of changing a vehicle color in response to detecting a collision and/or driver distress, according to an embodiment.

FIG. 18 is a schematic view of a process for changing a vehicle's exterior color in response to a collision, driver distress, or any other detected emergency that requires visually signaling people outside of the vehicle. Starting in step 1802, a color change module can monitor a vehicle's sensors for indicators of a collision and/or driver distress. Indicators of a collision could include air bag deployment and/or detecting a collision directly from a collision sensor in the vehicle. Indicators of driver distress could include steering wheel information that indicates that a driver is swerving, for example. In some cases, images from a camera inside the vehicle could be analyzed to detect signs of distress.

In step 1804 the module determines if any collisions and/or driver distress have been detected. If not, the module can return to monitoring the vehicle sensors in step 1802. If a collision, driver distress or any other emergency has been detected, the module can proceed to step 1806. In step 1806, the module can engage an emergency color signaling system. Specifically, the module can change the exterior color of the vehicle in a manner that visually signals to anyone nearby that help may be needed. In some cases, the module can change the exterior vehicle color between a first color and a second color, holding each color for a predetermined period. Specifically, for example, in step 1808 the module could change the exterior vehicle color to white for a predetermined period (for example, a few seconds) and then, in step 1810, the module could change the exterior vehicle color to red for a predetermined period (for example, a few seconds). If no one as deactivated the emergency color signaling system in step 1812, this process of switching the exterior vehicle color can continue so that vehicle appears to flash between white and red. Once the system has been deactivated, for example by pressing a button on touch screen in the vehicle or giving a voice command, the module proceeds to step 1814. In step 1814, the module changes the exterior vehicle color back to a default color of the vehicle, in situations where there is a default color.

It may be appreciated that the module can change the color of either the entire exterior of the vehicle or only portions of the exterior. Moreover, any suitable colors could be used. Furthermore, the duration of the cycle between two or more colors can vary from less than a second to more than ten seconds. In some cases, the severity of the emergency could affect both the colors used and/or the cycle time for changing the colors.

The embodiments make use of one or more motor vehicles. As used herein, the term "motor vehicle," or simply vehicle, refers to any kind of car, van, truck, motorcycle, or similar motorized vehicle. A motor vehicle can be powered using an internal combustion engine, an electric motor, a hybrid of an internal combustion engine and an electric motor, as well as any other suitable power source. A motor vehicle may further include wheels that are powered by the engine or motor and components for controlling the vehicle (for example, pedals and a steering wheel).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A motor vehicle, comprising:
a vehicle body, a motor and a set of wheels;
a color changing layer attached to a portion of the vehicle body;
a sensor;
an onboard computing system including:
a processor; and
memory storing a color change module;
wherein the color change module is configured to receive sensor information from the sensor and control the color changing layer in response to the sensor information;
wherein the color change module also receives weather information and wherein the color change module uses the sensor information and the weather information to control the color changing layer wherein the color change module also receives information about an environment of the motor vehicle, the environment being associated with a background color and wherein the background color associated with the environment is identified using a machine learning algorithm;
wherein the color change module determines a target exterior vehicle color that contrasts substantially with the background color and controls the color changing layer to change an exterior color of the motor vehicle from a current exterior vehicle color to the target exterior vehicle color when the target exterior vehicle color is substantially different from the current exterior vehicle color.

2. The motor vehicle according to claim 1, wherein the color changing layer is a layer of thermochromic paint.

3. The motor vehicle according to claim 1, wherein the color changing layer includes an electroluminescent material.

4. The motor vehicle according to claim 1, wherein the color changing layer includes electronic ink.

5. The motor vehicle according to claim 1, wherein the sensor is an optical sensor.

6. The motor vehicle according to claim 1, wherein the color changing layer covers a substantial majority of the vehicle body.

7. The motor vehicle according to claim 1, wherein the color change module is further configured to receive a selected exterior vehicle color from an application running on a mobile device;
wherein the instructions are further executable to identify the background color associated with the environment using a machine learning algorithm.

8. A motor vehicle, comprising:
a vehicle body, a motor and a set of wheels;
a color changing layer attached to a portion of the vehicle body; and
an onboard computing system including:
a processor; and
memory storing instructions that are executable by the processor to:
determine a current exterior vehicle color;
receive information about an environment of the motor vehicle, the environment being associated with a background color;
determine a target exterior vehicle color that contrasts substantially with the background color; and
change an exterior color of the motor vehicle from the current exterior vehicle color to the target exterior vehicle color when the target exterior vehicle color is substantially different from the current exterior vehicle color.

9. The motor vehicle according to claim 8, wherein the information about the environment includes time of day information.

10. The motor vehicle according to claim 8, wherein the information about the environment includes weather information.

11. The motor vehicle according to claim 8, wherein the information about the environment includes image information.

12. The motor vehicle according to claim 8, wherein the on board computing system is configured to receive a selected exterior vehicle color from an application running on a mobile device.

13. The motor vehicle according to claim 8, wherein the machine learning algorithm is a neural network.

14. A color change system for use in a motor vehicle, the color change system comprising:
a color changing layer attached to a portion of the motor vehicle;
a sensor;
a computing system including:
a processor; and
memory storing a color change module;
wherein the color change module is configured to receive sensor information from the sensor and control the color changing layer in response to the sensor information;
wherein the color changing layer is attached to a body of the motor vehicle; and
wherein the color changing layer covers a substantial majority of the body of the motor vehicle wherein the color change module also receives information about an environment of the motor vehicle, the environment being associated with a background color and wherein the background color associated with the environment is identified using a machine learning algorithm; and
wherein the color change module determines a target exterior vehicle color that contrasts substantially with the background color and controls the color changing layer to change an exterior color of the motor vehicle from a current exterior vehicle color to the target exterior vehicle color when the target exterior vehicle color is substantially different from the current exterior vehicle color.

15. The color change system according to claim 14, wherein the color changing layer is a layer of thermochromic paint.

16. The color change system according to claim 14, wherein the color changing layer includes an electroluminescent material.

17. The color change system according to claim 14, wherein the color changing layer includes electronic ink.

18. The color change system according to claim 14, wherein the sensor is an optical sensor.

19. The color change system according to claim 14, wherein the color change module also receives weather information and wherein the color change module uses the sensor information and the weather information to control the color changing layer.

20. The color change system according to claim 14, wherein the color change module also receives information about an environment of the motor vehicle, the environment being associated with a background color; and wherein the color change module is further configured to receive a selected exterior vehicle color from an application running on a mobile device.

\* \* \* \* \*